United States Patent
Du

(10) Patent No.: US 12,365,820 B2
(45) Date of Patent: Jul. 22, 2025

(54) FRAME GLUE MATERIAL, DISPLAY PANEL, AND MANUFACTURING METHOD THEREOF

(71) Applicant: TCL CHINA STAR OPTOELECTRONICS TECHNOLOGY CO., LTD., Guangdong (CN)

(72) Inventor: Xuan Du, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 846 days.

(21) Appl. No.: 17/426,887

(22) PCT Filed: Jun. 8, 2021

(86) PCT No.: PCT/CN2021/098917
§ 371 (c)(1),
(2) Date: Jul. 29, 2021

(87) PCT Pub. No.: WO2022/198803
PCT Pub. Date: Sep. 29, 2022

(65) Prior Publication Data
US 2023/0365847 A1     Nov. 16, 2023

(30) Foreign Application Priority Data
Mar. 24, 2021 (CN) .......................... 202110311402.3

(51) Int. Cl.
*C09J 163/10*     (2006.01)

(52) U.S. Cl.
CPC .................................. *C09J 163/10* (2013.01)

(58) Field of Classification Search
CPC ...................................................... C09J 163/10
See application file for complete search history.

(56) References Cited

FOREIGN PATENT DOCUMENTS

| | | |
|---|---|---|
| CN | 1049370 A | 2/1991 |
| CN | 110157369 A | 8/2019 |
| CN | 111218247 A | 6/2020 |
| CN | 112063350 A | 12/2020 |
| CN | 112080239 A | 12/2020 |
| TW | 201527496 A | 7/2015 |

OTHER PUBLICATIONS

Yoshiyuki et al., Machine English Translation of TW 201527496 (Year: 2015).*

* cited by examiner

*Primary Examiner* — Jessica M Roswell

(57) ABSTRACT

A frame glue material, a display panel, and a manufacturing method thereof are disclosed. The frame glue material includes a photoinitiator, a thermal curing agent, and an epoxy acrylate resin, and a chemical structural formula of the epoxy acrylate resin is:

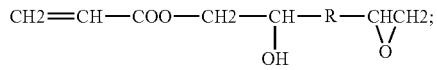

wherein, R includes at least one of resorcinol, hydroquinone, or bisphenol A.

17 Claims, 1 Drawing Sheet

FRAME GLUE MATERIAL, DISPLAY PANEL, AND MANUFACTURING METHOD THEREOF

FIELD OF INVENTION

The present disclosure relates to the field of display technologies, and more particularly, to a frame glue material, a display panel, and a manufacturing method thereof.

BACKGROUND OF INVENTION

Liquid crystal display panels include a color filter substrate, an array substrate disposed opposite to the color filter substrate, a frame glue disposed between the color filter substrate and the array substrate, and liquid crystal molecules filled in a liquid crystal cell formed by the color filter substrate, the array substrate, and the frame glue. The frame glue plays a role of sealing the liquid crystal cell to prevent liquid crystals from leaking or to prevent air from entering the liquid crystal cell.

At present, due to a narrow frame requirement of display panels, a bezel width of the display panels is getting smaller, the liquid crystals are closer to the frame glue, and line circuits in bezel areas are denser, so light transmitting areas become smaller. A curing process of the frame glue includes photo curing and thermal curing. Since the light transmitting areas become smaller, actual illumination on the frame glue in a photo-curing stage is reduced, thereby reducing a degree of curing. Therefore, it is easy for ingredients in the frame glue to precipitate and contaminate the liquid crystals, thereby reducing product yields.

Technical problem: an embodiment of the present disclosure provides a frame glue material, a display panel, and a manufacturing method thereof to solve technical problems of reduced product yields caused by the ingredients in the frame glue being easy to precipitate and contaminate the liquid crystals due to the frame glue having a low degree of curing in the photo-curing stage in current technology.

SUMMARY OF INVENTION

In order to solve the above technical problems, an embodiment of the present disclosure provides a frame glue material. The frame glue material includes a photoinitiator, a thermal curing agent, and an epoxy acrylate resin, and a chemical structural formula of the epoxy acrylate resin is:

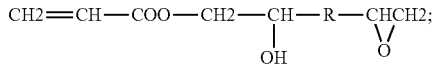

wherein, R includes at least one of resorcinol, hydroquinone, or bisphenol A.

In an embodiment of the present disclosure, a molar percentage of the epoxy acrylate resin in the frame glue material ranges from 60% to 70%, a molar percentage of the photoinitiator in the frame glue material ranges from 1% to 5%, and a molar percentage of the thermal curing agent in the frame glue material ranges from 1% to 5%.

In an embodiment of the present disclosure, the frame glue material further includes a cross-linking agent, fillers, and an additive.

In an embodiment of the present disclosure, a molar percentage of the cross-linking agent in the frame glue material ranges from 1% to 5%, a molar percentage of the fillers in the frame glue material ranges from 1% to 10%, and a molar percentage of the additive in the frame glue material ranges from 1% to 5%.

In an embodiment of the present disclosure, the photoinitiator includes 2-hydroxy-methylphenylpropan-1-one, the thermal curing agent includes amine compounds or anhydride compounds, the cross-linking agent includes organosilane compounds, and the fillers include at least one of organic fillers or inorganic fillers.

Based on the above objective of the present disclosure, a manufacturing method of a display panel is provided. The method includes following steps:
  coating a frame glue material on a substrate, wherein, the frame glue material includes an epoxy acrylate resin;
  performing a photo-curing treatment on the frame glue material; and
  performing a thermal-curing treatment on the frame glue material to form a frame glue.

In an embodiment of the present disclosure, a chemical structural formula of the epoxy acrylate resin is:

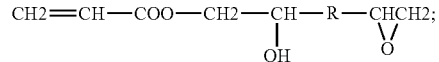

wherein, R includes at least one of resorcinol, hydroquinone, or bisphenol A.

In an embodiment of the present disclosure, a manufacturing method of the epoxy acrylate resin includes following steps:
  mixing an epoxy resin and a polymerization inhibitor to form a first solution; and
  adding acrylic acid and a catalyst into the first solution and reacting to obtain the epoxy acrylate resin;
  wherein, the polymerization inhibitor includes hydroquinone or p-tert-butylcatechol, the catalyst includes N,N-dimethylaniline, and a molar ratio of the epoxy resin to acrylic acid ranges from 1/3 to 3.

In an embodiment of the present disclosure, the step of performing the photo-curing treatment on the frame glue material includes a following step: the epoxy acrylate resin being cross-linked and cured to obtain a polymer, and a chemical structural formula of the polymer is:

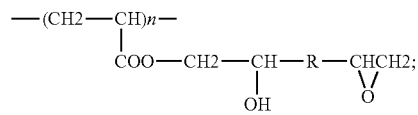

wherein, R includes at least one of resorcinol, hydroquinone, or bisphenol A.

In an embodiment of the present disclosure, the frame glue material further includes a photoinitiator and a thermal curing agent; and a molar percentage of the epoxy acrylate resin in the frame glue material ranges from 60% to 70%, a molar percentage of the photoinitiator in the frame glue material ranges from 1% to 5%, and a molar percentage of the thermal curing agent in the frame glue material ranges from 1% to 5%.

In an embodiment of the present disclosure, the frame glue material further includes a cross-linking agent, fillers, and an additive.

In an embodiment of the present disclosure, a molar percentage of the cross-linking agent in the frame glue material ranges from 1% to 5%, a molar percentage of the fillers in the frame glue material ranges from 1% to 10%, and a molar percentage of the additive in the frame glue material ranges from 1% to 5%.

In an embodiment of the present disclosure, the photoinitiator includes 2-hydroxy-methylphenylpropan-1-one, the thermal curing agent includes amine compounds or anhydride compounds, the cross-linking agent includes organosilane compounds, and the fillers include at least one of organic fillers or inorganic fillers.

Based on the above objective of the present disclosure, a display panel is provided. The display panel is manufactured by a frame glue material, wherein, the frame glue material includes a photoinitiator, a thermal curing agent, and an epoxy acrylate resin, and a chemical structural formula of the epoxy acrylate resin is:

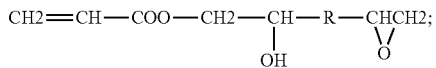

wherein, R includes at least one of resorcinol, hydroquinone, or bisphenol A.

In an embodiment of the present disclosure, a molar percentage of the epoxy acrylate resin in the frame glue material ranges from 60% to 70%, a molar percentage of the photoinitiator in the frame glue material ranges from 1% to 5%, and a molar percentage of the thermal curing agent in the frame glue material ranges from 1% to 5%.

In an embodiment of the present disclosure, the frame glue material further includes a cross-linking agent, fillers, and an additive.

In an embodiment of the present disclosure, a molar percentage of the cross-linking agent in the frame glue material ranges from 1% to 5%, a molar percentage of the fillers in the frame glue material ranges from 1% to 10%, and a molar percentage of the additive in the frame glue material ranges from 1% to 5%.

In an embodiment of the present disclosure, the photoinitiator includes 2-hydroxy-methylphenylpropan-1-one, the thermal curing agent includes amine compounds or anhydride compounds, the cross-linking agent includes organosilane compounds, and the fillers include at least one of organic fillers or inorganic fillers.

Beneficial effect: compared to current technology, the present disclosure uses the epoxy acrylate resin as a main resin in the frame glue material. Acrylic acid groups in the epoxy acrylate resin are easy to cross-link in a photo-curing stage, so entire epoxy acrylate resin can be cross-linked together in the photo-curing stage, thereby improving a degree of cross-linking and curing of the frame glue material in the photo-curing stage. Therefore, it is not easy for ingredients in the frame glue material to precipitate, so the frame glue material can be prevented from contaminating liquid crystals, thereby improving product yields.

DESCRIPTION OF DRAWINGS

The following detailed description of specific embodiments of the present disclosure will make the technical solutions and other beneficial effects of the present disclosure obvious with reference to the accompanying drawings.

DETAILED DESCRIPTION OF PREFERRED EMBODIMENTS

Figure 1:
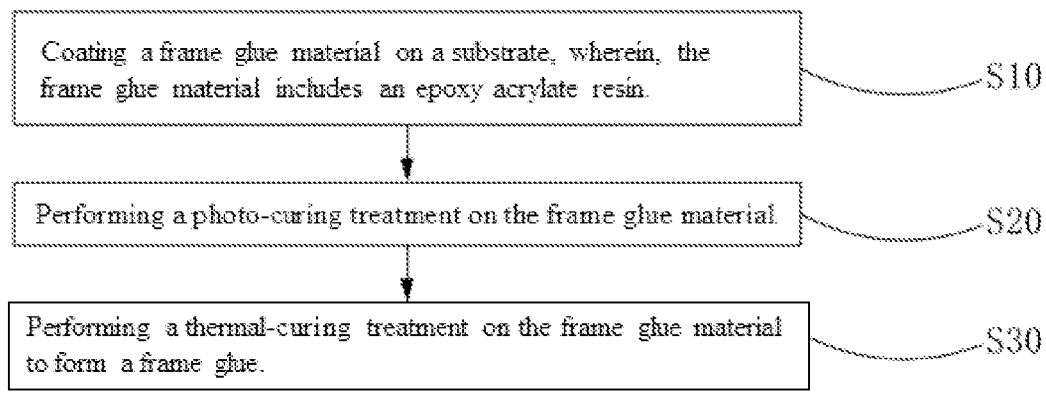
FIG. 1 is a flowchart of a manufacturing method of a display panel according to an embodiment of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

The following description provides many different embodiments or examples for implementing different structures of the present disclosure. In order to simplify the present disclosure, the components and settings of a specific example are described below. Of course, they are merely examples and are not intended to limit the present disclosure. In addition, the present disclosure may repeat reference numerals and/or reference letters in different examples, which are for the purpose of simplicity and clarity, and do not indicate the relationship between the various embodiments and/or arrangements discussed. In addition, the present disclosure provides examples of various specific processes and materials, but one of ordinary skill in the art will recognize the use of other processes and/or the use of other materials.

Regarding current frame glue materials, display panels, and manufacturing methods thereof, since frame glues have a low degree of curing in a photo-curing stage, it is easy for ingredients in the frame glues to precipitate and contaminate liquid crystals, thereby reducing product yields. An embodiment of the present disclosure can solve the above technical problems.

In order to solve the above technical problems, an embodiment of the present disclosure provides a frame glue material. The frame glue material includes a photoinitiator, a thermal curing agent, and an epoxy acrylate resin, and a chemical structural formula of the epoxy acrylate resin is:

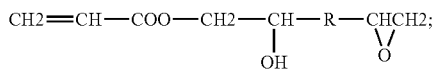

wherein, R includes at least one of resorcinol, hydroquinone, or bisphenol A.

During practical applications, the current frame glue materials include ingredients such as epoxy resin oligomers, acrylic acid monomers, photoinitiators, thermal curing agents, cross-linking agents, and fillers. Due to a narrow frame requirement of the display panels, a bezel width of the display panels is getting smaller, the liquid crystals are closer to the frame glues, and line circuits in bezel areas are denser, so light transmitting areas become smaller. A curing process of the frame glues includes photo curing and thermal curing. Since the light transmitting areas become smaller, actual illumination on the frame glue materials in the photo-curing stage is reduced, thereby reducing a degree of curing. After photo curing, only acrylic acid is cured in entire frame glues, while epoxy resins having a large content are completely uncured, so the frame glues have a low degree of cross-linking. Therefore, it is easy for the ingredients in the frame glue materials to precipitate and contaminate the liquid crystals, thereby reducing the product yields. The embodiment of the present disclosure uses the epoxy acrylate resin as a main resin in the frame glue material. Acrylic acid groups in the epoxy acrylate resin are easy to cross-link in the photo-curing stage, so entire epoxy acrylate resin can be cross-linked together in the photo-curing stage, thereby improving a degree of cross-linking and curing of the frame glue material in the photo-curing stage. Therefore, it is not easy for ingredients in the frame glue material to precipitate, so the frame glue material can be prevented from contaminating the liquid crystals, thereby improving the product yields.

Further, the frame glue material provided by an embodiment of the present disclosure includes the epoxy acrylate resin, the photoinitiator, the thermal curing agent, a cross-linking agent, fillers, and an additive. Wherein, a molar percentage of the epoxy acrylate resin in the frame glue material ranges from 60% to 70%, a molar percentage of the photoinitiator in the frame glue material ranges from 1% to 5%, and a molar percentage of the thermal curing agent in the frame glue material ranges from 1% to 5%. A molar percentage of the cross-linking agent in the frame glue material ranges from 1% to 5%, a molar percentage of the fillers in the frame glue material ranges from 1% to 10%, and a molar percentage of the additive in the frame glue material ranges from 1% to 5%.

Specifically, the chemical structural formula of the epoxy acrylate resin is:

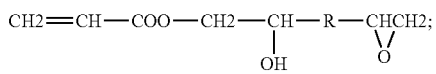

wherein, R includes at least one of resorcinol, hydroquinone, or bisphenol A. Since the epoxy acrylate resin has a faster photo-curing rate, the degree of cross-linking and curing of the frame glue material in the photo-curing stage can be improved.

The photoinitiator includes 2-hydroxy-methylphenylpropan-1-one. In other embodiments of the present disclosure, the photoinitiator may also include at least one of cationic photoinitiators or free radical photoinitiators, and specifically may include at least one of dibenzoyl peroxide, dilauroyl peroxide, azobisisobutyronitrile, 2,2'-azobisisoheptonitrile, diisopropyl peroxydicarbonate, or dicyclohexyl peroxydicarbonate.

The thermal curing agent includes amine compounds or anhydride compounds, and specifically may include diethylenetriamine or methylhexahydrophthalic anhydride.

The cross-linking agent includes organosilane compounds, that is, the cross-linking agent includes organosilane cross-linking agents.

The fillers include at least one of organic fillers or inorganic fillers. In an embodiment of the present disclosure, the fillers include a mixture of the organic fillers and the inorganic fillers. Wherein, the organic fillers may be one or more of wood flour or α-cellulose, and the inorganic fillers may be one or more of calcium carbonate microspheres or silica microspheres. In addition, the fillers may also include at least one of calcium carbonate powders, kaolin powders, glass powders, alumina powders, nylon powders, or plant fibres.

The additive includes at least one of coupling agents, defoamers, or plasticizers. Specifically, the coupling agents include one or more of organosilane compounds, polyisocyanate, or titanate compounds, and the organosilane compounds are preferably organosilicon micropowders. The defoamers include one or more of high-alcohol fatty acid esters, polyoxyethylene polyoxy propylene pentaotlythnitol, polyoxyethylene polyoxypropylene ether, polyoxypropylene glycerol ether, polyoxypropylene polyoxyethylene glyceryl ether, or polydimethylsiloxane. The plasticizers include one or more of phthalates, aliphatic dibasic acid esters, phosphate esters, phenyl polycarboxylic esters, fluorene-containing diesters, alkyl sulfonic esters, polyol esters, or epoxy compounds.

In summary, the frame glue material provided in the embodiment of the present disclosure uses the epoxy acrylate resin as the main resin in the frame glue material. The acrylic acid groups in the epoxy acrylate resin are easy to cross-link in the photo-curing stage, so entire epoxy acrylate resin can be cross-linked together in the photo-curing stage, thereby improving the degree of cross-linking and curing of the frame glue material in the photo-curing stage. Therefore, it is not easy for the ingredients in the frame glue material to precipitate, so the frame glue material can be prevented from contaminating the liquid crystals, thereby improving the product yields.

In addition, an embodiment of the present disclosure further provides a manufacturing method of a display panel. In a manufacturing process of the display panel, the frame glue material in the above embodiments is adopted for manufacturing. Referring FIG. 1, the method includes following steps.

S10: Coating the frame glue material on a substrate, wherein, the frame glue material includes the epoxy acrylate resin.

S20: Performing a photo-curing treatment on the frame glue material.

S30: Performing a thermal-curing treatment on the frame glue material to form a frame glue.

It should be noted that the display panel provided in the embodiment is a liquid crystal display panel. The display panel is composed of an array substrate (thin film transistors, TFTs), a color filter substrate (color filter, CF), and the liquid crystals (LCs) and the frame glue (sealant) sandwiched between the array substrate and the color filter substrate. Wherein, a process of adding the liquid crystals between the array substrate and the color filter substrate is called one drop filling (ODF), and mainly includes several processes such as frame glue material coating, liquid crystal injection, and frame glue material curing. The array substrate and the color filter substrate are attached to each other and sealed by the frame glue. After injecting the liquid crystals, the ingredients in the frame glue undergo a chemical reaction by ultraviolet (UV) light irradiation and heating to be cured and to form a three-dimensional bridge structure, thereby having sufficient adhesion strength to bond the array substrate to the color filter substrate. The manufacturing method of the display panel provided in the embodiment of the present disclosure mainly introduces the processes of frame glue material coating and frame glue material curing. Other steps may be processed according to conventional processes, and will not be repeated here.

Specifically, the frame glue material is coated onto the substrate. Wherein, the frame glue material includes the epoxy acrylate resin, the photoinitiator, the thermal curing agent, the cross-linking agent, the fillers, and the additive. The molar percentage of the epoxy acrylate resin in the frame glue material ranges from 60% to 70%, the molar percentage of the photoinitiator in the frame glue material ranges from 1% to 5%, and the molar percentage of the thermal curing agent in the frame glue material ranges from 1% to 5%. The molar percentage of the cross-linking agent in the frame glue material ranges from 1% to 5%, the molar percentage of the fillers in the frame glue material ranges from 1% to 10%, and the molar percentage of the additive in the frame glue material ranges from 1% to 5%.

Specifically, the chemical structural formula of the epoxy acrylate resin is:

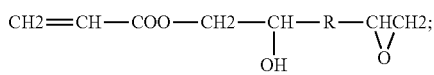

wherein, R includes at least one of resorcinol, hydroquinone, or bisphenol A. Since the epoxy acrylate resin has the faster photo-curing rate, the degree of cross-linking and curing of the frame glue material in the photo-curing stage can be improved.

Further, a manufacturing method of the epoxy acrylate resin includes following steps:
  mixing an epoxy resin and a polymerization inhibitor to form a first solution; and
  adding acrylic acid and a catalyst into the first solution and reacting to obtain the epoxy acrylate resin.

Wherein, the polymerization inhibitor includes hydroquinone or p-tert-butylcatechol, the catalyst includes N,N-dimethylaniline, and a molar ratio of the epoxy resin to acrylic acid ranges from 1/3 to 3 and includes endpoint values, that is, the molar ratio of the epoxy resin to acrylic acid may be 1:3 or 3:1.

Specifically, the manufacturing method of the epoxy acrylate resin includes following steps: taking a certain amount of the epoxy resin and the polymerization inhibitor (such as hydroquinone or p-tert-butylcatechol) and adding them to a four-necked flask, heating and stirring to a temperature ranging from 50° C. to 80° C., adding a mixed liquid of acrylic acid and N,N-dimethylaniline into the four-necked flask slowly, and keeping the temperature for reaction to obtain the epoxy acrylate resin. Wherein, N,N-dimethylaniline is used as the catalyst, the molar ratio of the epoxy resin to acrylic acid is 1:1, and a reaction formula of a manufacturing process of the epoxy acrylate resin is:

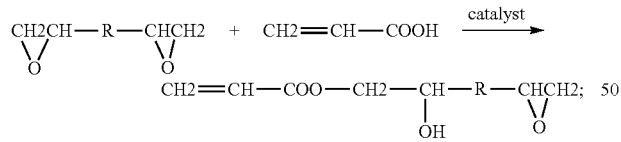

The photoinitiator includes 2-hydroxy-methylphenylpropan-1-one. In other embodiments of the present disclosure, the photoinitiator may also include at least one of the cationic photoinitiators or the free radical photoinitiators, and specifically may include at least one of dibenzoyl peroxide, dilauroyl peroxide, azobisisobutyronitrile, 2,2'-azobisisoheptonitrile, diisopropyl peroxydicarbonate, or dicyclohexyl peroxydicarbonate.

The thermal curing agent includes the amine compounds or the anhydride compounds, and specifically may include diethylenetriamine or methylhexahydrophthalic anhydride.

The cross-linking agent includes the organosilane compounds, that is, the cross-linking agent includes the organosilane cross-linking agents.

The fillers include at least one of the organic fillers or the inorganic fillers. In an embodiment of the present disclosure, the fillers include the mixture of the organic fillers and the inorganic fillers. Wherein, the organic fillers may be one or more of wood flour or α-cellulose, and the inorganic fillers may be one or more of the calcium carbonate microspheres or the silica microspheres. In addition, the fillers may also include at least one of the calcium carbonate powders, the kaolin powders, the glass powders, the alumina powders, the nylon powders, or the plant fibres.

The additive includes at least one of the coupling agents, the defoamers, or the plasticizers. Specifically, the coupling agents include one or more of the organosilane compounds, polyisocyanate, or the titanate compounds, and the organosilane compounds are preferably the organosilicon micropowders. The defoamers include one or more of high-alcohol fatty acid esters, polyoxyethylene polyoxy propylene pentaotlythnitol, polyoxyethylene polyoxypropylene ether, polyoxypropylene glycerol ether, polyoxypropylene polyoxyethylene glyceryl ether, or polydimethylsiloxane. The plasticizers include one or more of phthalates, aliphatic dibasic acid esters, phosphate esters, phenyl polycarboxylic esters, fluorene-containing diesters, alkyl sulfonic esters, polyol esters, or the epoxy compounds.

In this embodiment of the present disclosure, the step of performing the photo-curing treatment on the frame glue material includes following steps: a UV curing treatment is performed on the frame glue material, and the epoxy acrylate resin is cross-linked and cured to obtain a polymer after UV irradiation. A chemical structural formula of the polymer is:

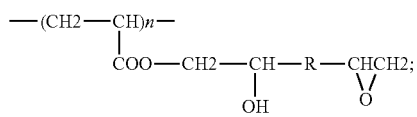

wherein, R includes at least one of resorcinol, hydroquinone, or bisphenol A.

Further, a reaction formula of a photo-curing process of the epoxy acrylate resin is:

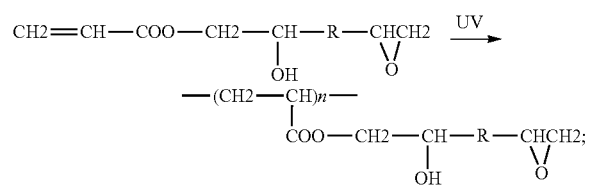

In this embodiment, the photo-curing process is under a room temperature reaction, and an accumulated amount of ultraviolet light is 3000 mj.

As shown in Table 1 below, Table 1 is a comparison between a cross-linking degree of the frame glue material provided in the embodiments of the present disclosure after photo curing and a cross-linking degree of a current frame glue material after photo curing according to an experiment in this embodiment of the present disclosure. Wherein, ingredients of the current frame glue material include the epoxy resin oligomers, the acrylic acid monomers, the photoinitiators, the thermal curing agents, the cross-linking agents, and the fillers, and the cross-linking degree thereof after photo curing is about 30%. However, the cross-linking degree of the frame glue material provided in the embodiments of the present disclosure after photo curing can reach to 60%, which is two times the current frame glue material. That is, it can demonstrate that the cross-linking degree of the frame glue material provided in the embodiments of the present disclosure during photo curing is much greater than that of the current frame glue material.

TABLE 1

|  | degree of cross-linking |
|---|---|
| current frame glue material | 30% |
| frame glue material provided in the embodiments of the present disclosure | 60% |

Figure 2:
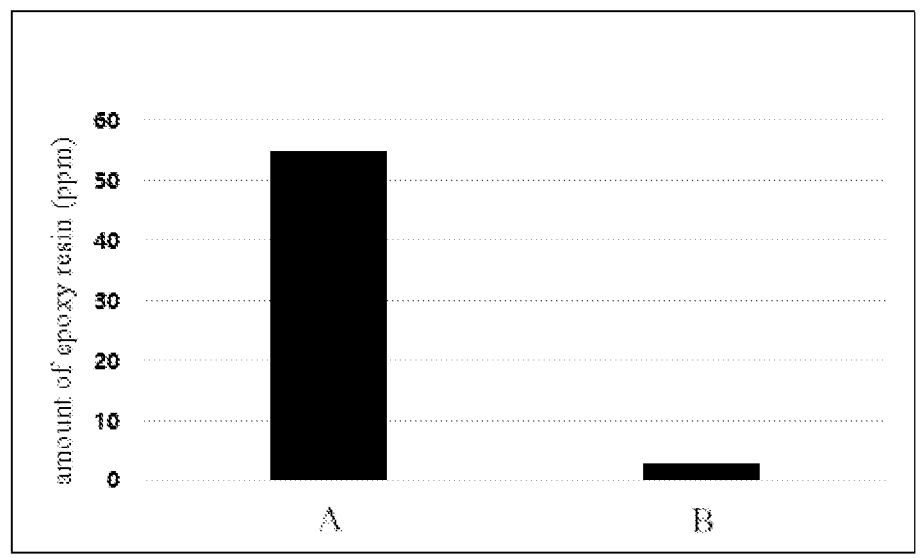
FIG. 2 is a histogram of precipitation amounts of epoxy resins in frame glue materials according to an embodiment of the present disclosure.

In addition, referring to FIG. 2, FIG. 2 is a precipitation test result of the epoxy resins by liquid chromatography-mass spectrometry technique (LC-MS technique) regarding the frame glue material provided in the embodiments of the present disclosure and the current frame glue material when only photo curing is performed and without thermal curing. Wherein, A denotes a test result of the current frame glue material, and B denotes a test result of the frame glue material provided in the embodiments of the present disclosure. For the current frame glue material, a large amount of epoxy resins is precipitated, and an amount of the epoxy resins precipitated is about 55 ppm; and for the frame glue material provided in the embodiments of the present disclosure, only a very small amount of epoxy resins is precipitated, and an amount of the epoxy resins precipitated is about 2.5 ppm. That is, it can demonstrate that compared to the current frame glue material, stability of cross-linking and curing of the frame glue material provided in the embodiments of the present disclosure after photo curing has greatly improved.

In addition, a subsequent thermal curing process may be processed according to conventional processes, which is not repeated here.

An embodiment of the present disclosure further provides the display panel, which includes the frame glue material mentioned in the above embodiments or is manufactured by the manufacturing method of the display panel mentioned in the above embodiments. The display panel uses the epoxy acrylate resin as the main resin in the frame glue material. The acrylic acid groups in the epoxy acrylate resin are easy to cross-link in the photo-curing stage, so entire epoxy acrylate resin can be cross-linked together in the photo-curing stage, thereby improving the degree of cross-linking and curing of the frame glue material in the photo-curing stage. Therefore, it is not easy for the ingredients in the frame glue material to precipitate, so the frame glue material can be prevented from contaminating the liquid crystals, thereby improving the product yields.

An embodiment of the present disclosure further provides a display device, which includes the display panel mentioned in the above embodiment.

In the above embodiments, the description of each embodiment has its own emphasis. For the parts that are not described in detail in an embodiment, can refer to the detailed description of other embodiments above.

The frame glue material, the display panel, and the manufacturing method thereof provided in the embodiments of the present disclosure are described in detail above. The specific examples are applied in the description to explain the principle and implementation of the disclosure. The description of the above embodiments is only for helping to understand the technical solution of the present disclosure and its core ideas, and it is understood that many changes and modifications to the described embodiment can be carried out without departing from the scope and the spirit of the disclosure that is intended to be limited only by the appended claims.

What is claimed is:

1. A frame glue material, comprising, on basis of a total molar amount of the frame glue material, a photoinitiator in a molar percentage of 1% to 5%, a thermal curing agent in a molar percentage of 1% to 5%, and an epoxy acrylate resin in a molar percentage of 60% to 70%, wherein a chemical structural formula of the epoxy acrylate resin is:

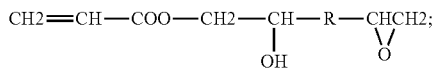

wherein R comprises at least one of resorcinol, hydroquinone, or bisphenol A, and the photoinitiator is selected from at least one of 2-hydroxy-methylphenylpropan-1-one, dibenzoyl peroxide, dilauroyl peroxide, azobisisobutyronitrile, 2,2'-azobisisoheptonitrile, diisopropyl peroxydicarbonate, or dicyclohexyl peroxydicarbonate.

2. The frame glue material according to claim 1, further comprising a cross-linking agent, fillers, and an additive.

3. The frame glue material according to claim 2, wherein a molar percentage of the cross-linking agent in the frame glue material ranges from 1% to 5%, a molar percentage of the fillers in the frame glue material ranges from 1% to 10%, and a molar percentage of the additive in the frame glue material ranges from 1% to 5%.

4. The frame glue material according to claim 2, wherein the photoinitiator comprises 2-hydroxy-methylphenylpropan-1-one, the thermal curing agent comprises amine compounds or anhydride compounds, the cross-linking agent comprises organosilane compounds, and the fillers comprise at least one of organic fillers or inorganic fillers.

5. A manufacturing method of a display panel, comprising following steps:
coating a frame glue material on a substrate, wherein the frame glue material comprises, on basis of a total molar amount of the frame glue material, a photoinitiator in a molar percentage of 1% to 5%, a thermal curing agent in a molar percentage of 1% to 5%, and an epoxy acrylate resin in a molar percentage of 60% to 70%;
performing a photo-curing treatment on the frame glue material; and
performing a thermal-curing treatment on the frame glue material to form a frame glue,
wherein a chemical structural formula of the epoxy acrylate resin is:

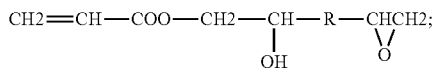

R comprises at least one of resorcinol, hydroquinone, or bisphenol A, and the photoinitiator is selected from at least one of 2-hydroxy-methylphenylpropan-1-one, dibenzoyl peroxide, dilauroyl peroxide, azobisisobutyronitrile, 2,2'-azobisisoheptonitrile, diisopropyl peroxydicarbonate, or dicyclohexyl peroxydicarbonate.

6. The manufacturing method of the display panel according to claim 5, wherein a manufacturing method of the epoxy acrylate resin comprises following steps:
mixing an epoxy resin and a polymerization inhibitor to form a first solution; and
adding acrylic acid and a catalyst into the first solution and reacting to obtain the epoxy acrylate resin;
wherein the polymerization inhibitor comprises hydroquinone or p-tert-butylcatechol, the catalyst comprises N,N-dimethylaniline, and a molar ratio of the epoxy resin to acrylic acid ranges from 1/3 to 3.

7. The manufacturing method of the display panel according to claim 5, wherein the step of performing the photo-curing treatment on the frame glue material comprises a following step: the epoxy acrylate resin being cross-linked and cured to obtain a polymer, wherein a chemical structural formula of the polymer is:

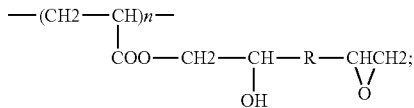

wherein R comprises at least one of resorcinol, hydroquinone, or bisphenol A.

8. The manufacturing method of the display panel according to claim 5, wherein the frame glue material further comprises a cross-linking agent, fillers, and an additive.

9. The manufacturing method of the display panel according to claim 8, wherein a molar percentage of the cross-linking agent in the frame glue material ranges from 1% to 5%, a molar percentage of the fillers in the frame glue material ranges from 1% to 10%, and a molar percentage of the additive in the frame glue material ranges from 1% to 5%.

10. The manufacturing method of the display panel according to claim 8, wherein the photoinitiator comprises 2-hydroxy-methylphenylpropan-1-one, the thermal curing agent comprises amine compounds or anhydride compounds, the cross-linking agent comprises organosilane compounds, and the fillers comprise at least one of organic fillers or inorganic fillers.

11. A display panel, manufactured by a frame glue material, wherein the frame glue material comprises, on basis of a total molar amount of the frame glue material, a photoinitiator in a molar percentage of 1% to 5%, a thermal curing agent in a molar percentage of 1% to 5%, and an epoxy acrylate resin in a molar percentage of 60% to 70%, and a chemical structural formula of the epoxy acrylate resin is:

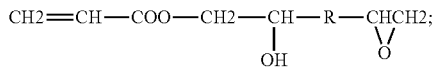

wherein R comprises at least one of resorcinol, hydroquinone, or bisphenol A, and
the photoinitiator is selected from at least one of 2-hydroxy-methylphenylpropan-1-one, dibenzoyl peroxide, dilauroyl peroxide, azobisisobutyronitrile, 2,2'-azobisisoheptonitrile, diisopropyl peroxydicarbonate, or dicyclohexyl peroxydicarbonate.

12. The display panel according to claim 11, wherein the frame glue material further comprises a cross-linking agent, fillers, and an additive.

13. The display panel according to claim 12, wherein a molar percentage of the cross-linking agent in the frame glue material ranges from 1% to 5%, a molar percentage of the fillers in the frame glue material ranges from 1% to 10%, and a molar percentage of the additive in the frame glue material ranges from 1% to 5%.

14. The display panel according to claim 12, wherein the photoinitiator comprises 2-hydroxy-methylphenylpropan-1-one, the thermal curing agent comprises amine compounds or anhydride compounds, the cross-linking agent comprises organosilane compounds, and the fillers comprise at least one of organic fillers or inorganic fillers.

15. The frame glue material according to claim 4, wherein the thermal curing agent comprises diethylenetriamine or methylhexahydrophthalic anhydride.

16. The frame glue material according to claim 4, wherein the organic fillers comprise at least one of wood flour, α-cellulose, nylon powders, or plant fibres, and the inorganic fillers comprise at least one of calcium carbonate microspheres, silica microspheres, calcium carbonate powders, kaolin powders, glass powders, or alumina powders.

17. The frame glue material according to claim 1, wherein the frame glue material is curable at an accumulated amount of ultraviolet light of 3000 mj/m2 to a cross-linking degree of 60%.

* * * * *